United States Patent [19]

Jones et al.

[11] Patent Number: 4,875,346
[45] Date of Patent: Oct. 24, 1989

[54] TWO-STATGE SORPTION TYPE CRYOGENIC REFRIGERATOR INCLUDING HEAT REGENERATION SYSTEM

[75] Inventors: Jack A. Jones, Los Angeles; Liang-Chi Wen, La Canada; Steven Bard, Northridge, all of Calif.

[73] Assignee: The United States of America as represented by the Administrator of the National Aeronautics and Space Administration, Washington, D.C.

[21] Appl. No.: 304,149

[22] Filed: Jan. 31, 1989

[51] Int. Cl.$^4$ ............................................. F25B 1/00
[52] U.S. Cl. ...................................... 62/467; 62/46.1
[58] Field of Search ................................. 62/467, 48

[56] References Cited

U.S. PATENT DOCUMENTS

| | | | |
|---|---|---|---|
| 3,854,301 | 12/1974 | Cytryn | 62/101 |
| 4,111,002 | 9/1978 | Van Mal et al. | 62/514 R |
| 4,183,227 | 1/1980 | Bouvin | 62/480 |
| 4,346,563 | 8/1982 | Hood | 62/117 |
| 4,366,680 | 1/1983 | Tward | 62/514 R |
| 4,593,534 | 6/1986 | Yamauchi et al. | 62/467 |
| 4,643,000 | 2/1987 | Rheinfelder | 62/467 |
| 4,697,425 | 10/1987 | Jones | 62/48 |
| 4,712,610 | 12/1987 | Kesten et al. | 62/467 |
| 4,718,242 | 1/1988 | Bloomfield | 62/467 |
| 4,831,829 | 5/1989 | Jones et al. | 62/22 |

OTHER PUBLICATIONS

Jones, J. A. and Blue, G. D., Oxygen Chemisorption Compressor Study J-T Refrigeration, AIAA 1558 (1987).
T. Nast, G. Bell, and C. Barnes, Development of Gas Gap Cryogenic Thermal Switch, 27 Advances in Cryogenic Engineering 1117 (1981).
R. P. Bywaters and R. A. Griffin, A Gas-Gap Thermal Switch for Cryogenic Applications, 6 Cryogenics 344 (1973).

Primary Examiner—Ronald C. Capossela
Attorney, Agent, or Firm—Thomas H. Jones; John R. Manning; Charles E. B. Glenn

[57] ABSTRACT

A lower stage chemisorption refrigeration system physically and functionally coupled to an upper stage physical adsorption refrigeration system. Waste heat generated by the lower stage cycle is regenerated to fuel the upper stage cycle thereby greatly improving the energy efficiency of a two-stage sorption refrigerator. The two stages are joined by disposing a first pressurization chamber providing a high pressure flow of a first refrigerant for the lower stage refrigeration cycle within a second pressurization chamber providing a high pressure flow of a second refrigerant for the upper stage refrigeration cycle. The first pressurization chamber is separated from the second pressurization chamber by a gas-gap thermal switch which at times is filled with a thermoconductive fluid to allow conduction of heat from the first pressurization chamber to the second pressurization chamber.

19 Claims, 2 Drawing Sheets

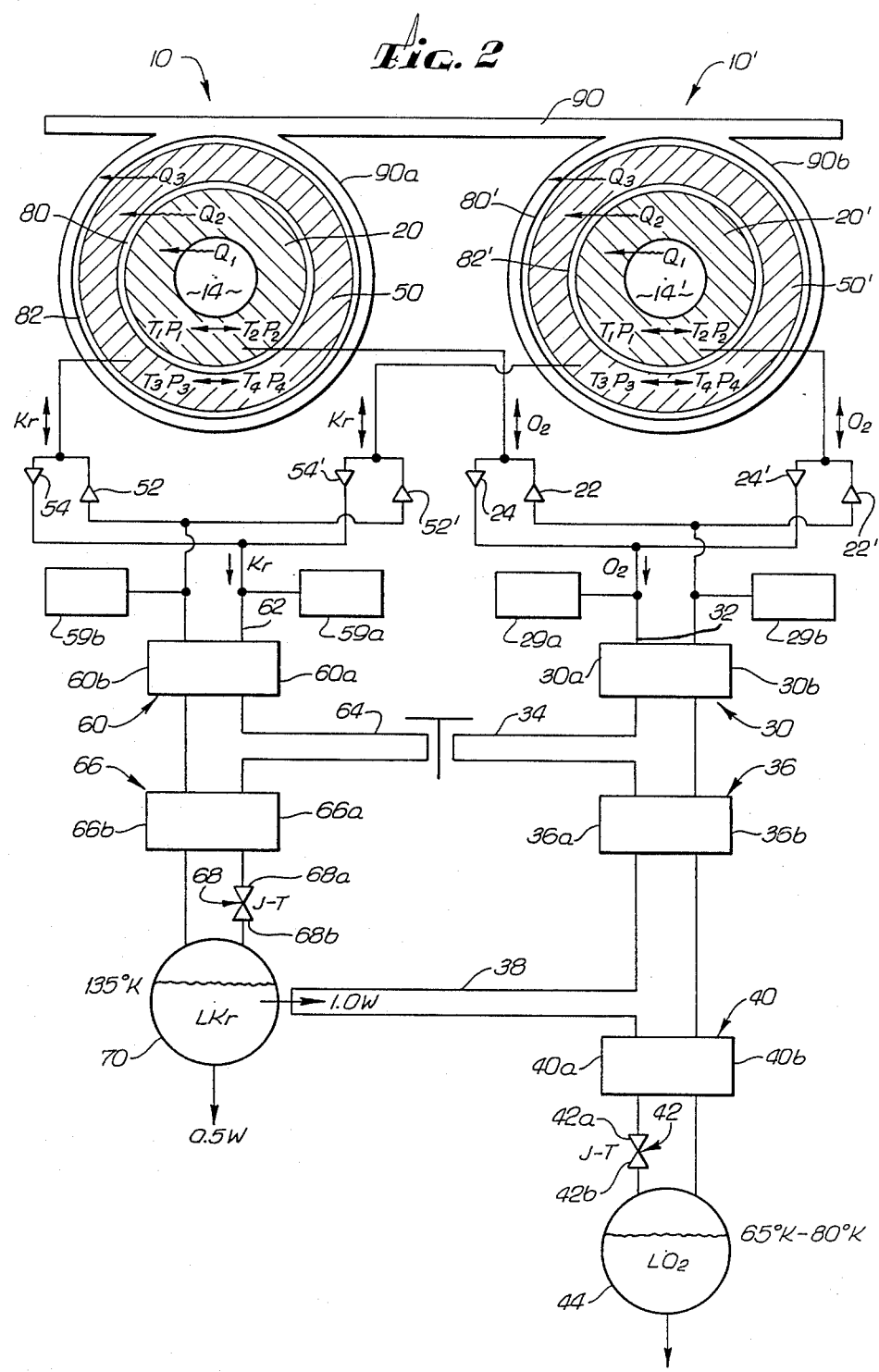

TWO-STATGE SORPTION TYPE CRYOGENIC REFRIGERATOR INCLUDING HEAT REGENERATION SYSTEM

ORIGIN OF THE INVENTION

The invention described herein was made in the performance of work under a NASA contract, and is subject to the provisions of Public Law 96-517 (35 U.S.C. 202) in which the Contractor has elected not to retain title.

BACKGROUND OF THE INVENTION

The present invention relates to cryogenic sorption refrigeration systems. More specifically, the invention relates to two-stage sorption refrigeration systems.

Sorption refrigeration systems have been developed in the past to provide refrigerators with long lifetimes (e.g. 10 years or more) which will operate with little or no mechanical vibration.

Such refrigerators have been particularly useful in aerospace environments such as on board a space satellite where longevity of the refrigerator is of utmost importance and sensitive equipment must be cooled without vibrational disturbance.

Refrigeration systems employing non-mechanical compressors, generally referred to as sorption refrigerators, employ either a physical adsorption (physisorption) system or a chemical absorption (chemisorption) system.

A chemisorption refrigerator, providing cooling in the temperature range of 55° to 100° K. is disclosed in U.S. Pat. No. 4,697,425 to Jones. The refrigerant used in U.S. Pat. No. 4,697,425 is oxygen.

Briefly, in a chemisorption system such as the one disclosed in U.S. Pat. No. 4,697,425, a sorbent material reversibly chemically reacts with oxygen to absorb oxygen at a relatively low first temperature and pressure. When heated to a second temperature, the sorbent releases oxygen at high pressure. A container is provided to contain the oxygen while it is heated. Once an amount of oxygen is adequately pressurized an outlet valve provided on the container is opened to direct the pressurized oxygen away from the sorbent material. The oxygen is then subjected to precooling and directed to the high pressure side of a high pressure/low pressure orifice (Joule-Thomson) expansion valve. Heat is absorbed (and cooling takes place) when the pressurized oxygen expands into the low pressure side of the orifice. The oxygen at this point is typically in both gas and liquid phases at a low temperature. A liquid/gas transition chamber is provided for collecting the liquid oxygen. The liquid oxygen is used for cooling such as for the cooling of an infrared sensor. The liquid oxygen, by absorbing heat from the to-be-cooled material, will then boil and leave the transition chamber. On its return path to the containers for chemical absorption onto cooled absorbent material, the oxygen's temperature will be raised from the low temperature to the first temperature. By providing two containers and alternately heating and cooling the two containers, a continuous source of high pressure high temperature oxygen may be provided.

U.S. patent application Ser. No. 07/149,821 of Jones and Schember, discloses a physisorption-type refrigerator. This physisorption-type refrigerator provides cooling in the temperature range of 120° to 160° K.

The operation of a physisorption refrigerator such as disclosed in U.S. Pat. No. 4,831,829 can be summarized as follows. A refrigerant (in this case krypton) is precooled and physically adsorbed onto the cavity walls of a porous adsorption material, at a first temperature. Charcoal or another high surface area adsorbing matrice is generally used as the adsorption material. The sorbent (charcoal) and refrigerant (krypton) are then heated to a higher second temperature while the refrigerant is trapped in the sorbent. The pressure of the trapped refrigerant rises with the temperature and the refrigerant is driven off the sorbent surface. The refrigerant is then subjected to precooling and passed through a Joule-Thomson (J-T) expansion valve to decrease its pressure. The refrigerant at this point is typically both in liquid and gas phases at a low temperature. The liquid is collected into a liquid/gas transition chamber where the refrigerant begins reverting back to a gaseous phase by absorbing heat from a to-be-cooled heat source (refrigeration load). After leaving the transition chamber the temperature of the refrigerant is then raised from the low temperature to the first temperature and the refrigerant is readsorbed onto the cavity walls of the sorbent.

The disclosures of U.S. Pat. Nos. 4,697,425 and 4,831,829 are hereby incorporated by reference into this application.

Chemisorption refrigeration systems and physisorption refrigeration systems have different temperature ranges of operation and therefore may be advantageously employed together to provide cooling over a broader temperature range. A two stage refrigeration system using a methane physisorption upper stage to precool an oxide chemisorption lower stage is illustrated in FIG. 1. (This system is described in detail in Jones, J. A. and Blue, G. D., *Oxygen Chemisorption Compressor Study for Cryogenic J-T refrigeration*, AIAA 1558 (1987), incorporated herewith by reference). As shown in FIG. 1, a self-contained charcoal/methane upper stage 2 provides precooling to 140° K. for a self-contained oxide chemisorption lower stage 4. As shown schematically in FIG. 1 the stages operate independently, in side-by-side fashion. Only the low temperature portion of the upper stage 2 is in contact with portion 6 of lower stage 4 to provide precooling of the oxygen.

One of the primary disadvantages of sorption refrigeration systems has been their unusually high power requirements when compared to conventional mechanical refrigeration cooling systems. A two-stage oxide/krypton sorption refrigerator could be expected to require about 155 watts of heat to produce 1 watt of cooling at 65° K. This compares with about 60 watts of power for a mechanical refrigerator.

SUMMARY OF THE INVENTION

The present invention provides a two-stage sorption type cryogenic refrigeration system with greatly improved efficiency.

The present invention further provides a two-stage sorption refrigeration system wherein waste heat generated by a lower stage chemisorption-type cycle fuels an upper stage physisorption-type cycle.

The present invention further provides a two-stage sorption refrigeration system which provides a continuous flow of an upper stage and a lower stage refrigerant.

In the present invention a two-stage sorption refrigeration system includes a container which in turn includes a central heater enclosed in sequence by a first pressurization chamber, a gas-gap thermal switch and a second pressurization chamber. The first pressurization chamber contains a first sorbent material which absorbs a first refrigerant at a first temperature and pressure and liberates the first refrigerant at a higher second pressure at a second higher temperature. The second pressurization chamber contains a second sorbent material which adsorbs a second refrigerant at a third temperature and pressure and desorbs the second refrigerant at a higher fourth pressure at a fourth, higher temperature.

In a preferred embodiment of a krypton/oxygen two-stage sorption refrigeration system, two containers each include central heaters enclosed in sequence by a first pressurization chamber, a first gas-gap thermal switch, a second pressurization chamber, a second gas-gap thermal switch and a radiator. Each of the first pressurization chambers contains a sorbent material which absorbs oxygen gas by chemisorption at a first temperature and pressure and liberates oxygen at a higher second pressure at a second, higher temperature. The second pressurization chambers contain a sorbent material which physically adsorbs krypton gas at a third temperature and pressure and desorbs krypton gas at a higher fourth pressure at a fourth, higher temperature.

Oxygen gas is admitted into the first pressurization chamber of a preselected one of the containers where it is absorbed by the sorbent. The chamber is then heated by the central heater to produce a heated, high pressure oxygen gas which is released to a cooling and expansion system including a precooling chamber where the oxygen's temperature is reduced to below its critical temperature so as to liquify the oxygen. The liquid oxygen is expanded to provide cooling down to approximately 65° K.

After release of the oxygen from the first pressurization chamber, heat provided by the heater to produce the high pressure oxygen remains in the first pressurization chamber. This waste heat is allowed to conduct across the first gas-gap thermal switch of the preselected container to heat the second pressurization chamber of the preselected container. Krypton gas, previously admitted to the second pressurization chamber and physically adsorbed to the sorbent contained therein, is thereby heated to a temperature where it is desorbed at higher pressure.

Fueled by the heat from the chemisorption stage as described above, high pressure krypton gas is provided without input of any additional energy. The high pressure krypton is released from the second pressurization chamber to a cooling and expansion system where it provides about 135° K. precooling to the flow of oxygen from one of the first pressurization chambers while the oxygen flows through the precooling chamber.

Waste heat from the second pressurization chamber is transmitted across the second gas-gap thermal switch of the preselected container to the radiator of the preselected container so as to allow cooling of the second pressurization chamber.

A preferred embodiment of the present invention in a two-stage oxygen/krypton system thus provides efficient cooling at about 65° K. with additional net cooling at about 135° K.

BRIEF DESCRIPTION OF THE DRAWINGS

FIG. 2 is a schematic diagram of a two-stage sorption refrigeration system according to the preferred embodiment of the present invention.

DETAILED DESCRIPTION OF THE INVENTION

Figure 1:
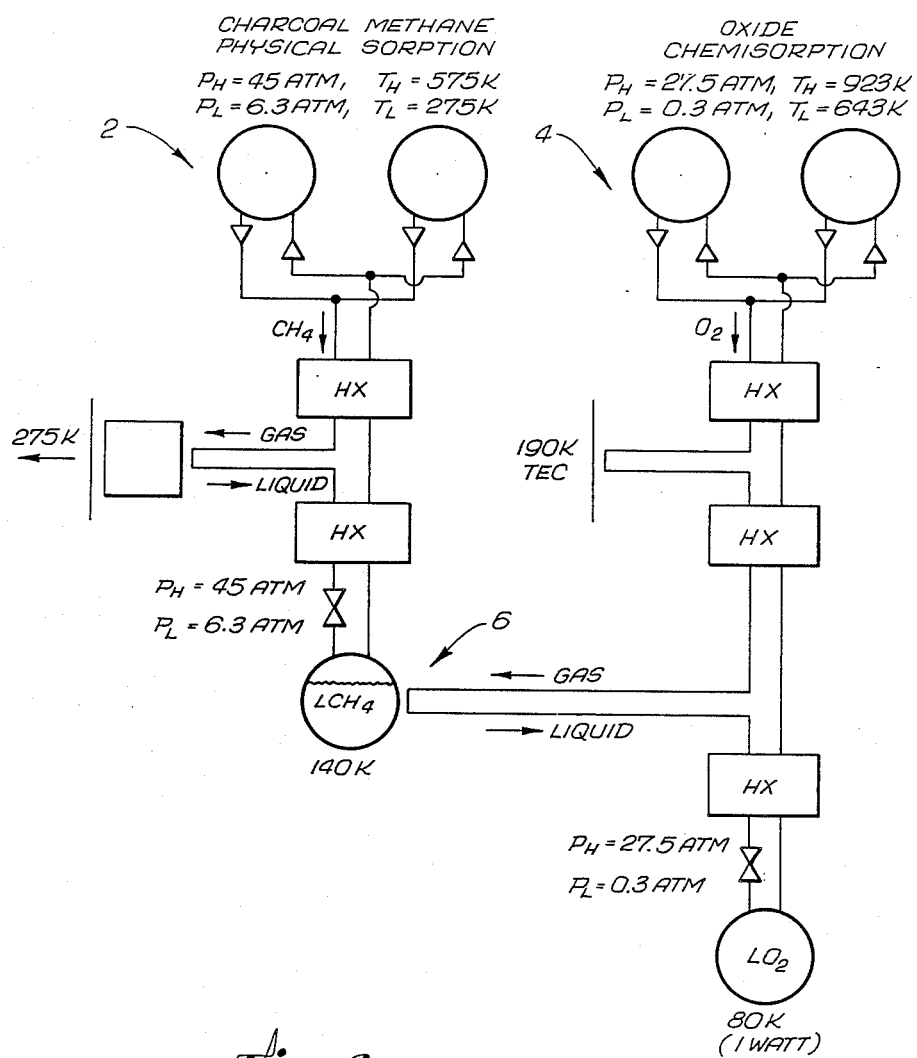
FIG. 1 is a schematic diagram of the prior art methane/oxygen two-stage sorption refrigeration system as described in Jones, J. A. and Blue, G. D., *Oxygen Chemisorption Compressor Study for Cryogenic J-T refrigeration,* AIAA 1558 (1987).

The following description is of the best presently contemplated mode for carrying out the present invention. It is to be understood that this description is provided for the purpose of illustrating the general principles of the invention and not for the purpose of limiting the scope of the invention. The scope of the invention is better defined by reference to the accompanying claims.

FIG. 2 illustrates schematically the structural features of the two-stage sorption refrigeration system of the present invention. The system comprises first and second containers 10 and 10'. As will be described in more detail below, the use of two containers allows a continuous flow of refrigerant for cooling. In applications where an intermittent flow of refrigerant can be tolerated, only a single container 10 may be employed. Each of the containers 10 and 10' includes a central heater 14 and 14', respectively. Each container 10 and 10' further includes first and second pressurization chambers 20 and 20' which encircle heaters 14 and 14', respectively.

Pressurization chambers 20 and 20' are made of a material that has high strength at high temperature, for example, inconel. The pressurization chambers 20 and 20' function together to provide a continuous flow of a high pressure first refrigerant, oxygen gas. Each chamber 20 and 20' includes a solid material which acts as a sorbent, preferably praseodymium/cerium oxide (PCO), which will chemically absorb oxygen at low pressures (e.g. 0.023 atmospheres) at approximately 300° C. (573° K.) and will liberate or desorb oxygen at higher pressures (e.g. 22 atmospheres or above) when the material is heated to approximately 600° C. (873° K.). The heaters 14 and 14' are provided to heat the material in subchambers 20 and 20'. A suitable heater includes a heating element which is able to provide the necessary high temperature. Cartridge heaters may be employed.

The refrigeration system of the invention operates so that as one of the chambers 20 and 20' is being heated, the other chamber is being cooled. Additional chambers may also be added and timed in a staggered fashion. A microprocessor control system is employed to determine the sequence and duration of operation of the heaters. Each of the chambers 20 and 20' is provided with respective inlet check valves 22 and 22' and respective outlet check valves 24 and 24' of a type well known to those skilled in the art. The outlet valves 24 and 24' are connected to a first side 30a of a first heat exchanger 30 by a suitable length of tubing 32. A suitable heat exchanger may comprise two tubes soldered together. However, the heat exchangers may be formed by any available counterflow structures.

The first heat exchanger side 30a couples as shown to a 200° K. radiator 34 and, thereafter, in series to a first side 36a of a second heat exchanger 36, a precooling chamber 38, a first side 40a of a third heat exchanger 40 and the high pressure side of a first Joule-Thomson (J-T) valve 42. The low pressure side of the J-T valve 42 is connected in series back to the chambers 20 and 20' through a first liquid/gas transition chamber 44, a second side 40b of the third heat exchanger 40, a second side 36b of the second heat exchanger 36, a second side 30b of the first heat exchanger 30, and the inlet check valves 22 and 22'.

The containers 10 and 10' further include third and fourth pressurization chambers 50 and 50', respectively. Chambers 50 and 50' can be made of a lower melting point material than chambers 20 and 20', for example, stainless steel. Chambers 50 and 50' function together to provide a continuous flow of a high pressure second refrigerant, krypton gas. Each chamber contains a mass of sorbent material such as charcoal, or more preferably, a monolithic porous carbon such as saran carbon type A (the inert pyrolysis product of essentially 100% polyvinylidene chloride, PVDC).

The sorbent material will physically adsorb krypton gas at low pressures (e.g. 3 atm). The krypton gas will be desorbed or liberated at high pressure (e.g. 40 atm) when heated to 300° C. (573° K.).

Each of the chambers 50 and 50' is provided with respective inlet check valves 52 and 52' and respective outlet check valves 54 and 54'. The outlet valves 54 and 54' are connected to a first side 60a of a fourth heat exchanger 60 by means of a suitable length of tubing 62. The fourth heat exchanger side 60a couples to a 200° K. radiator 64 as shown in FIG. 2. Alternatively, the 200° K. radiators 34 and 64 may be replaced with a single 200° K. radiator or a thermoelectrical cooler which brings the temperature of both the krypton and oxygen down to 200° K.

The radiator 64, in turn, couples to a first side 66a of a fifth heat exchanger 66 and then the high pressure side 68a of a second J-T valve 68. The low pressure side 68b of the J-T valve is connected in series back to the chambers 50 and 50' through a second liquid/gas transition chamber 70, a second side 66b of the fifth heat exchanger 66, a second side 60b of the fourth heat exchanger 60 and the inlet check valves 52 and 52'.

Each of the first and second containers 10 and 10' is further provided with first and second gas-gap thermal switches. More specifically, separating the chambers 20 and 20' from the chambers 50 and 50' are first gas-gap thermal switches 80 and 80', respectively. The chambers 50 and 50' are encircled in turn by respective second gas-gap thermal switches 82 and 82' which separate the chambers 50 and 50' from first and second radiator saddles 90a and 90b of a 0° C. (273° K.) radiator 90.

Each of the gas-gap thermal switches 80, 80', 82 and 82' is sized to be able to contain a predetermined amount of thermoconductive gas. Preferably the gap in the switches will measure 1/10 to 1/1000 of an inch. To maintain the diameter of the thermal gas-gap switches and thereby the spacing between the respective first and second pressurization chambers and the radiator saddles, chambers 20 and 50 and 20' and 50' are provided with protrusions which interconnect (not shown). For example, subchamber 20 may be provided with a knife-edge protrusion on one side which fits into a contact point provided on subchamber 50; the subchambers 20 and 50 may be further connected by a flange on the opposite side of the knife-edge protrusion/contact point. Similarly, subchamber 50 and radiator saddle 90a may be provided with connecting protrusions. The protrusions connecting and spacing the chambers are made of a material having low thermal conductivity.

Figure 3:
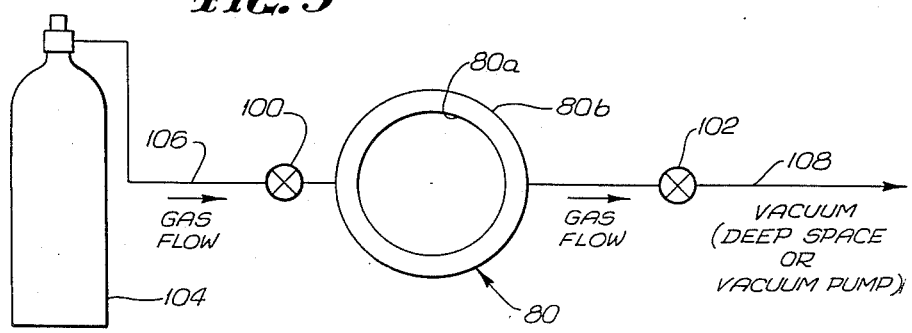
FIG. 3 is a schematic diagram of a gas-gap thermal switch included in the heat regeneration system utilized by the present invention.

FIG. 3 illustrates schematically structural features of the gas-gap thermal switches. Each of the gas-gap thermal switches 80, 80', 82 and 82' includes the features shown in FIG. 3. For illustrative purposes, however, only gas-gap thermal switch 80, as shown in FIG. 3, will be described in detail. Switch 80 comprises an inner wall 80a and an outer wall 80b. Forming the inner wall 80a is the pressurization chamber 20. The outer wall 80b is formed by the pressurization chamber 50. (The inner walls of gas-gap thermal switches 82 and 82', on the other hand, are formed by pressurization chambers 50 and 50', respectively, and the outer walls of switches 82 and 82' are formed by radiator saddles 90a and 90b.)

The walls 80a and 80b are coated with a reflective material. Gold is a suitable reflective material. Alternatively, a gold-plated substrate such as nickel foil or other reflective materials with sufficiently high melting points may be employed. The switch 80 is provided with an inlet valve 100 and an outlet valve 102. A fluid supply bottle 104 is connected to the inlet valve by a pipe 106. The fluid supply bottle 104 holds a fluid having good thermoconductivity. Helium gas is preferred for space applications of the refrigerator or nitrogen gas for ground applications. Other gases such as oxygen or hydrogen may also be employed. The outlet valve 102 is connected to a vacuum via pipe 108.

Each of the gas-gap thermal switches 80, 80', 82 and 82' is operated in two states, a first state wherein the switch is devoid of gas i.e. a vacuum or substantial vacuum exists in the region between walls 80a and 80b; and a second state wherein the switch is filled with a small amount of gas supplied by gas supply bottle 104.

The oxygen and krypton gases flow through the two-stage sorption system of the present invention in the following manner.

Chamber 20 receives oxygen gas at a first temperature $T_1$ of, for example, 300° C. (573° K.) and a first pressure $P_1$ of, for example, 0.023 atm through the inlet check valve 22. The inlet check valve 22 of the chamber 20 is opened to let the oxygen into the selected chamber 20. The corresponding outlet check valve 24 is closed at this time and the gas-gap thermal switch 80 is devoid of gas, in a state of vacuum.

A substantial portion of the oxygen entering the chamber 20 is absorbed by the sorbent material of the preselected chamber 20 by chemisorption. After a suitable length of time has elapsed to allow a predetermined amount of oxygen to be absorbed, the inlet valve 22 is automatically closed. For example, if oxygen is admitted through valve 22 at a pressure of 0.023 atm, the valve will be kept open for approximately 10 minutes to allow a sufficient amount of oxygen to enter chamber 20. In order to allow for differences in timing between the oxygen entering chamber 20 and the oxygen leaving chamber 20', a high pressure surge volume chamber 29a and a low pressure surge volume chamber 29b may be employed. These allow either high pressure or low pressure oxygen to be stored temporarily if there are any absorbing/desorbing cycle mismatches.

The temperature of the newly-filled chamber 20 is raised to a second temperature $T_2$ of approximately 600° C. (873° K.) by introducing a first amount of heat Q into the chamber 20. The heat can be generated by the heater 14 disposed centrally within the first container 10 as shown in FIG. 1 or by any other suitable means. Due to the temperature increase caused by the heating, oxygen gas is liberated from the sorbent at a higher second pressure $P_2$ of, for example, 22 atm. Once the selected chamber is pressurized to a desired pressure the outlet valve 24 is automatically opened and the gas is routed to the first heat exchanger 30.

During the time the oxygen and sorbent are being heated in chamber 20, krypton gas is admitted into chamber 50 at a third temperature $T_3$ of, for example, 0° C. (273° K.) and a third pressure $P_3$ of, for example, 3 atm through the inlet check valve 52. The corresponding outlet check valve 54 is closed at this time and the gas-gap thermal switch 80 remains devoid of gas.

A substantial amount of the krypton entering the chamber 50 is adsorbed by the sorbent material in chamber 50. After a predetermined length of time has elapsed and/or a predetermined amount of krypton gas is adsorbed, the inlet valve 52 is automatically closed. The vacuum and gold-plated walls of the gas-gap thermal switch 80 minimize conduction and/or radiation of heat from the chamber 20 to the chamber 50. Therefore, the krypton gas remains at the third temperature $T_3$. To ensure that minimal heat radiates across the gas-gap thermal switch, a number of thin shields coated with a reflective material may additionally be disposed throughout the switch 80. Again gold is the preferred reflective material since it will withstand high temperatures and is unlikely to oxidize and is therefore especially suitable for placement in harsh environments or for use in applications where parts may not readily be replaced.

After all or substantially all of the high pressure oxygen has been released from the chamber 20, the inlet valve 100 of gas-gap thermal switch 80 is automatically triggered to open. The valve may be triggered by a timer or alternatively by a temperature sensor located in pressurization chamber 20, which triggers the valve when the sorbent with absorbed oxygen has reached its second temperature $T_2$. Once the inlet valve 100 is opened, a small amount of gas from the fluid supply bottle 104 enters the switch 80 at a pressure of approximately 10 torr. The outlet valve 102 is closed at this time. After a predetermined amount of gas has entered the switch 80 or after expiration of a predetermined length of time, the inlet valve 100 is automatically closed and the gas is trapped in the switch 80 for a predetermined length of time. Presence of a gas having good thermal conductivity in the switch 80 allows an amount of heat $Q_2$ from pressurization chamber 20 to conduct across the switch 80 to pressurization chamber 50 where it will raise the temperature of the second sorbent with adsorbed krypton to a fourth temperature $T_2$ of approximately 300° C. (573° K.). Thus, the upper stage is efficiently fueled by regenerating waste heat of the lower stage while the loss of heat from chamber 20 to chamber 50 allows the temperature of chamber 20 to drop back down to the third temperature $T_3$ of approximately 300° C. (573° K.).

The waste heat collected in chamber 20 following release of the high pressure oxygen is greater than the heat needed to heat an equal volume of sorbent with adsorbed krypton in chamber 50. Therefore, chamber 50 may be over-sized and contain a greater amount of sorbent to absorb a larger volume of krypton. As a result, additional net cooling at about 135° K. will be achieved.

After expiration of the predetermined length of time, i.e. the time necessary to heat the contents of chamber 50 to the fourth temperature $T_4$, the outlet valve 102 is automatically opened and the gas is evacuated from the switch 80 through pipe 108.

In space applications of the refrigerator, helium is the preferred thermoconductive gas. When the outlet valve 102 is opened, the helium may be evacuated directly to the vacuum of deep space without mechanical pumping. For ground applications of the refrigerator, however, a vacuum pump must be used to evacuate the gas. Such vacuum pumps typically have difficulty pumping helium. Therefore, for ground applications, nitrogen, although of inferior thermal conductivity, is the preferred thermoconductive gas.

After all of the thermoconductive gas has been evacuated from the switch 80, outlet valve 102 is closed and the switch 80 is again devoid of gas, in a state of vacuum. Therefore, heat from the now heated chamber 50 may not conduct or radiate back to the now cool chamber 20. Once the sorbent in chamber 20 has been cooled to its first temperature, check valve 22 will again be triggered to open, an amount of oxygen will be admitted and the lower stage chemisorption cycle will be repeated.

Concurrently, the temperature increase to $T_4$ in chamber 50 drives off the krypton from the sorbent surface and raises its pressure from the third pressure $P_3$ of approximately 3 atm to a higher fourth pressure $P_4$ of, for example, 40 atm. Once the selected adsorption chamber 50 is pressurized to a desired pressure $P_4$, its outlet check valve 54 is opened automatically and the pressurized krypton gas is routed to the fourth heat exchanger 60.

After all or substantially all of the high pressure krypton gas has been released from the chamber 50, the inlet valve 100 of the second gas-gap thermal switch 82 is automatically triggered to open. Again the valve may be triggered by a timer or a temperature sensor. Once the inlet valve is opened, a small amount of gas from the fluid supply bottle 104 enters the switch 82 at a low pressure of approximately 10 torr. The outlet valve 102 is closed at this time. The inlet valve 100 is automatically closed after a predetermined amount of gas has entered the switch 82 or after expiration of a predetermined length of time, and the gas is trapped in the switch 82 for a predetermined length of time. Presence of the gas in the switch 82 allows an amount of heat $Q_3$ from the pressurization chamber 50 to conduct across the switch 82 to radiator saddle 90a of the 0° C. (273° K.) radiator 90. Chamber 50 is thereby cooled.

After expiration of a predetermined length of time, i.e. the time necessary for the temperature of chamber 50 to drop down to the third temperature $T_3$ of approximately 0° C. (273° K.), the outlet valve 102 is automatically opened and the gas is evacuated from the switch 82 through a pipe 108 directly to the vacuum of space or, if used on earth, with a mechanical vacuum pump. After all of the thermoconductive gas has been evacuated from the switch 82, outlet valve 102 is closed and switch 82 is again devoid of gas, in a state of vacuum. Any heat entering chamber 50 subsequently will not be lost to radiator 90 by radiation across switch 82 until thermoconductive gas is again admitted to switch 82.

Once the sorbate in chamber 50 has been cooled to the third temperature $T_3$, check valve 52 will again be triggered to open, an amount of krypton will be admitted and the upper stage sorption cycle will be repeated.

The pressurized krypton gas released from chamber 50 and routed to the fourth heat exchanger 60 is liquified at 200° K. as it travels through the 200° K. radiator 64. The gas then flows through the fifth heat exchanger 66 and the J-T valve 68 where it is expanded to provide cooling at approximately 135° K. The krypton is collected in the second liquid/gas transition chamber 70 where it acts as a refrigeration upper stage for 135° K. precooling of the oxygen flowing through precooling chamber 38. At 135° K. and 22 atm pressure the oxygen will be liquified.

The dual containers 10 and 10' are preferably operated in alternating fashion so that while oxygen is being admitted into the cooled chamber 20 for absorption and heating, pressurized oxygen gas is being released from chamber 20' and while krypton gas is being admitted into chamber 50 for adsorption and heating, pressurized krypton gas is being released from chamber 50'. In order to allow for differences in timing between the krypton gas entering chamber 50 and the krypton gas leaving chamber 50', a high pressure surge volume chamber 59a and a low pressure surge volume chamber 59b may be employed. These allow either high pressure or low pressure krypton to be stored temporarily if there are any absorbing/desorbing cycle mismatches. In this fashion, a substantially continuous flow of oxygen and krypton refrigerants can be maintained to thereby provide a substantially constant refrigeration capacity.

The refrigeration adsorption cycle as described above provides 1 watt of precooling to the oxygen stage plus an additional approximately 0.5 watt of cooling at 135° K. The precooled, liquified oxygen will in turn be expanded to provide 1 watt of cooling at 65° K. as it flows through the third heat exchanger 40, the first J-T valve 42 into the first liquid/gas transition chamber 44.

Table 1 (below) summarizes the approximate net power requirements, i.e. watts required to be input to produce 1 watt of cooling, of each of the stages of a two-stage sorption refrigeration system operated side-by-side and of a system utilizing the dual container arrangement with regeneration of heat system as provided by the present invention.

TABLE 1

| Stage | Net Power Required (watts in per each watt of cooling) Side-By-Side System | System of Present Invention |
| --- | --- | --- |
| Upper Stage Adsorption Cycle | 60 | 0 |
| Lower Stage Chemisorption Cycle | 95 | 95 |
| TOTAL | 155 | 95 |

It has been calculated that the side-by-side arrangement of a two-stage sorption refrigeration system has a total power requirement, excluding precooling at 200° K. of about 155 watts of heat for production of 1 watt of cooling at 65° K. The dual container arrangement with heat regeneration system, on the other hand, has been calculated to have a total power requirement, excluding precooling at 200° K., of about 95 watts of heat for production of 1 watt of cooling at 65° K. plus production of 0.5 watt of excess cooling at 135° K. Thus, the present invention provides a substantial net power saving of approximately 60 watts per watt of cooling by virtue of its unique arrangement of the pressurization chambers allowing utilization of a heat regeneration system.

The unique design of the present invention has approximately the same power requirements as mechanical refrigeration systems for one watt of cooling at 65° K. plus 0.5 watt of cooling at 135° K. However, the sorption refrigerator of the present invention has the multiple advantages of employing essentially no wear-related moving parts and therefore having a potentially very long life and operating with no measurable vibration.

In addition to the above described preferred embodiment, the heat regeneration system may be expanded to include a higher temperature gas cycle (600° C. to 900° C.) to fuel with its waste heat a lower stage sorption refrigeration cycle, which, in turn, fuels with its waste heat an upper stage sorption refrigeration cycle.

For example, a manganese nitride-nitrogen cycle may be added to the system. In such a system, the first and second containers 10 and 10' each include a third pressurization chamber. These third pressurization chambers are made of a very high strength material, such as MAR-M-26 alloy, and function together to provide a continuous flow of a high pressure third refrigerant, nitrogen. Each of the third pressurization chambers includes a material which acts as a sorbent, preferably manganese nitride, which will chemically absorb nitrogen at low pressures (e.g. 0.2 atm) at approximately 625° C. (998° K.) and will liberate or desorb nitrogen at higher pressures (e.g. 63 atm) when the material is heated to approximately 950° C. (1223° K.).

In a system including three pressurization chambers, the third pressurization chamber directly surrounds a central heater having a heating element able to provide temperatures to approximately 950° C. The third pressurization chamber is surrounded in sequence by a first gas-gap thermal switch, the first pressurization chamber, a second gas-gap thermal switch, the second pressurization chamber, a third gas gap thermal switch and a radiator providing cooling at approximately 0° C. The high pressure flow of nitrogen generated by the third pressurization chamber is expanded by an expansion system similar to the expansion system provided for expanding the high pressure flow of oxygen from the first pressurization chamber to provide one watt of cooling at approximately 80° K. As in the oxygen expansion system, the expanded krypton provides precooling of the nitrogen to 135° K. After the high pressure flow of nitrogen has been released from the third pressurization chamber, the remaining waste heat is allowed to conduct across the first gas-gap thermal switch, in a manner described previously, to heat the first sorbent in the adjacent first pressurization chamber. Inclusion of the manganese nitride-nitrogen cycle as described has been calculated to offer an additional net power savings of approximately 15%.

Other changes in the details of the preferred embodiment described may be made and such alternate embodiments are within the scope of the present invention. Therefore, the scope of the present invention should not be limited to the above detailed description but should rather be defined more broadly in light of its spirit, the accompanying claims and equivalents thereof.

We claim:

1. A two-stage sorption cryogenic refrigeration system adapted for use with a first refrigerant and a second refrigerant comprising:
   (a) a first container comprising:
   (1) a first pressurization chamber and a second pressurization chamber, the first pressurization chamber being disposed within the second pressurization chamber and the first pressurization chamber containing a first sorbent material for sorbing the first refrigerant, the second pressurization chamber containing a second sorbent material for sorbing the second refrigerant;

(2) means for heating the first pressurization chamber to thereby desorb the first refrigerant thereby generating a high pressure flow thereof;

(3) means for thermally coupling the first and second pressurization chambers; wherein heat from the first pressurization chamber heats the second pressurization chamber to thereby desorb the second refrigerant thereby generating a high pressure flow thereof;

(4) means for cooling the second pressurization chamber.

(b) first expansion means coupled to the first pressurization chamber for expanding the high pressure flow of the first refrigerant generated by the first pressurization chamber; and (c) second expansion means coupled to the second pressurization chamber for expanding the high pressure flow of the second refrigerant generated by the second pressurization chamber to provide precooling of the first refrigerant.

2. The refrigeration system of claim 1 wherein the means for thermally coupling the first and second pressurization chambers comprises a first gas-gap thermal switch, said first gas-gap thermal switch being disposed within the second pressurization chamber so as to separate the second pressurization chamber from the first pressurization chamber.

3. The refrigeration system of claim 2 wherein the first container further comprises a second gas-gap thermal switch, said second gas-gap thermal switch being disposed surrounding the second pressurization chamber.

4. The refrigeration system of claim 3 further comprising a fluid supply means for providing a thermoconductive fluid and further comprising two inlet valves wherein the fluid supply means is connected to the first and second gas-gap thermal switches by the two inlet valves, one valve being connected to each gas-gap thermal switch, and wherein a small amount of the thermoconductive fluid enters the first and second gas-gap thermal switches when the respective inlet valve is opened.

5. The refrigeration system of claim 4 wherein the first and second gas-gap thermal switches are each provided with an outlet valve, wherein when the respective inlet valve is closed and the respective outlet valve is opened, the thermoconductive fluid is evacuated from the gasgap thermal switch leaving the gas-gap thermal switch in a state of vacuum.

6. The refrigeration system of claim 5 wherein the first and second gas-gap thermal switches each comprise a first wall and a second wall, said first and second wall defining boundaries of a gas receiving space and said first and second wall each being coated with a reflective material to prevent heat from radiating across the gas receiving space of said first and second gas-gap thermal switches when said gas-gap thermal switches are in their states of vacuum.

7. The refrigeration system of claim 6 further comprising:

(a) a second container comprising:

(1) a first pressurization chamber and a second pressurization chamber, the first pressurization chamber being disposed within the second pressurization chamber and the first pressurization chamber containing a first sorbent material for sorbing the first refrigerant, the second pressurization chamber containing a second sorbent material for sorbing the second refrigerant;

(2) a first and a second gas-gap thermal switch, the first gas-gap thermal switch being disposed within the second pressurization chamber so as to separate the second pressurization chamber from the first pressurization chamber, the second gas-gap thermal switch being disposed surrounding the second pressurization chamber;

(3) means for cooling the second pressurization chamber; and (4) means for heating the first pressurization chamber.

8. The refrigeration system of claim 7 wherein the means for cooling the respective second pressurization chambers are interconnected and are disposed around the respective second gas-gap thermal switches.

9. The refrigeration system of claim 8 wherein the first and second containers are linked by the first expansion means and the second expansion means, wherein the first expansion means is coupled to the respective first pressurization chambers of the first container and the second container and wherein the second expansion means is coupled to the respective second pressurization chambers of the first container and the second container.

10. The refrigeration system of claim 6 wherein the first sorbent material contained in the first pressurization chamber is capable of chemically absorbing the first refrigerant at a first pressure and a first temperature and is capable of desorbing the first refrigerant at a second pressure when heated to a higher second temperature, wherein the first sorbent material is heated to the second temperature by conduction and radiation of a first amount of heat from the heating means and wherein said first sorbent material is cooled to the first temperature when a second amount of heat is conducted across the first gas-gap thermal switch to the second pressurization chamber while said first gas-gap thermal switch is filled with a small amount of thermoconductive fluid from the fluid supply means.

11. The refrigeration system of claim 10 wherein the second sorbent material contained in the second pressurization chamber is capable of physically adsorbing the second refrigerant at a third pressure and a third temperature and is capable of desorbing the second refrigerant at a fourth pressure when heated to a higher fourth temperature, wherein the second sorbent material is heated to the fourth temperature when the second amount of heat from the first pressurization chamber conducts across the first gas-gap thermal switch and wherein said second sorbent material is cooled to the third temperature when a third amount of heat is conducted across the second gas-gap thermal switch to be absorbed by the cooling means while said second switch is filled with a small amount of thermoconductive fluid from the fluid supply means.

12. The refrigeration system of claim 11 wherein the first refrigerant is comprised essentially of oxygen.

13. The refrigeration system of claim 12 wherein the second refrigerant is comprised essentially of krypton.

14. The refrigeration system of claim 13 wherein the first temperature is approximately 753° K., the first pressure is approximately 0.023 atm, the second temperature is approximately 873° K., the second pressure is approximately 22 atm, the third temperature is approximately 273° K., the third pressure is approximately 3 atm, the fourth temperature is approximately 553° K. and the fourth pressure is approximately 40 atm.

15. The refrigeration system of claim 14 wherein the first refrigerant generated by the first pressurization chamber provides cooling at 55° to 90° K.

16. The refrigeration system of claim 15 wherein the second refrigerant generated by the second pressurization chamber provides precooling of the first refrigerant at 130° to 150° K.

17. The refrigeration system of claim 16 wherein the thermoconductive fluid in the fluid supply means which fills the first and second gas-gap thermal switches to allow conduction of heat across said switches is selected from the group consisting of helium, nitrogen, oxygen and hydrogen.

18. In a method for providing cryogenic cooling by a two-stage sorption refrigerator wherein a first refrigerant is generated by a lower stage sorption cycle when a first sorbent is heated after sorbing the first refrigerant and a second refrigerant is generated by an upper stage sorption cycle when a second sorbent is heated after sorbing the second refrigerant and wherein the second refrigerant generated by the upper stage sorption cycle precools the first refrigerant generated by the lower stage sorption cycle, the improvement comprising the steps of:

(a) regenerating waste heat used for heating the first sorbent while the first refrigerant was sorbed thereon by providing the waste heat via thermal conduction means to heat the second sorbent while the second refrigerant is sorbed thereon, whereby the second refrigerant is desorbed at high pressure; and (b) the step of expanding the high pressure second refrigerant to provide precooling of the lower stage sorption cycle.

19. The method of claim 17 wherein the step of regenerating the heat comprises passing the heat through a gas-gap thermal switch by filling the switch with a conductive fluid whereby the conductive fluid conducts heat to the second sorbent material.

* * * * *

UNITED STATES PATENT AND TRADEMARK OFFICE
CERTIFICATE OF CORRECTION

PATENT NO. : 4,875,346

DATED : October 24, 1989

INVENTOR(S) : Jack A. Jones, Liang-Chi Wen and Steven Bard

It is certified that error appears in the above-identified patent and that said Letters Patent is hereby corrected as shown below:

On the title page, item [54] and column 1, lines 2, 3 and 4:
Title should be: TWO-STAGE SORPTION TYPE CRYOGENIC REFRIGERATOR INCLUDING HEAT REGENERATION SYSTEM Signed and Sealed this Twenty-seventh Day of November, 1990

Attest:

HARRY F. MANBECK, JR.

Attesting Officer     Commissioner of Patents and Trademarks